(12) United States Patent
Chen et al.

(10) Patent No.: US 12,394,846 B2
(45) Date of Patent: Aug. 19, 2025

(54) BATTERY

(71) Applicant: ZHUHAI COSMX BATTERY CO., LTD., Zhuhai (CN)

(72) Inventors: Longyun Chen, Zhuhai (CN); Yuxiang Zeng, Zhuhai (CN); Yongwang Wang, Zhuhai (CN); Desheng Xu, Zhuhai (CN); Hongkai Lin, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 501 days.

(21) Appl. No.: 18/146,008

(22) Filed: Dec. 23, 2022

(65) Prior Publication Data

US 2023/0126021 A1    Apr. 27, 2023

Related U.S. Application Data

(63) Continuation of application No. PCT/CN2021/139021, filed on Dec. 17, 2021.

(30) Foreign Application Priority Data

Dec. 21, 2020 (CN) .......................... 202023105005.0

(51) Int. Cl.
| | |
|---|---|
| *H01M 50/186* | (2021.01) |
| *H01M 50/109* | (2021.01) |
| *H01M 50/153* | (2021.01) |
| *H01M 50/533* | (2021.01) |
| *H01M 50/538* | (2021.01) |
| *H01M 50/636* | (2021.01) |

(52) U.S. Cl.
CPC ....... *H01M 50/186* (2021.01); *H01M 50/109* (2021.01); *H01M 50/153* (2021.01); *H01M 50/533* (2021.01); *H01M 50/538* (2021.01); *H01M 50/636* (2021.01)

(58) Field of Classification Search
CPC ............ H01M 50/186; H01M 50/109; H01M 50/538; H01M 50/533; H01M 50/636; H01M 50/153
See application file for complete search history.

(56) References Cited

FOREIGN PATENT DOCUMENTS

| CN | 111416068 A | 7/2020 |
| CN | 111446386 A | 7/2020 |

(Continued)

OTHER PUBLICATIONS

International Search Report and Written Opinion issued in corresponding PCT Application No. PCT/CN2021/139021, dated Mar. 15, 2022.

(Continued)

*Primary Examiner* — Sarah A. Slifka
(74) *Attorney, Agent, or Firm* — Westbridge IP LLC (57) ABSTRACT

Disclosed is a battery, the battery including a housing, where the housing is a metal piece, the housing includes a bottom shell and a cap, and the cap covers an opening of the bottom shell; the cap includes a mounting hole, a conductive sealing pin disposed in the mounting hole, a side periphery of the sealing pin is provided with a clamping groove, and the cap close to the mounting hole extends into the clamping groove and is in clamped connection to the clamping groove; and a seal is provided at a connection between the clamping groove and the cap, and the seal is an electrical insulator. The structure improves application stability of the battery and improves sealing performance and safety of the battery.

20 Claims, 3 Drawing Sheets

(56) References Cited

FOREIGN PATENT DOCUMENTS

| | | |
|---|---|---|
| CN | 111613739 A | 9/2020 |
| CN | 211404538 U | 9/2020 |
| CN | 111834557 A | 10/2020 |
| CN | 211654872 U | 10/2020 |
| CN | 111900275 A | 11/2020 |
| CN | 213816269 U | 7/2021 |
| JP | 3229347 U | 12/2020 |
| WO | 2007019754 A1 | 2/2007 |

OTHER PUBLICATIONS

Extended European Search Report issued in counterpart Europe Patent Application No. EP21909278.0, dated Jun. 28, 2024.

BATTERY

CROSS-REFERENCE TO RELATED APPLICATIONS

This application is a continuation application of International Application No. PCT/CN2021/139021, filed on Dec. 17, 2021, which claims priority to Chinese Patent Application No. 202023105005.0, filed with the China National intellectual Property Administration on Dec. 21, 2020, and entitled "BATTERY". Both of the aforementioned applications are hereby incorporated by reference in their entireties.

TECHNICAL FIELD

The present disclosure relates to the field of battery processing and manufacturing technologies, and in particular to a battery.

BACKGROUND

With the rapid development of science and technology, smart products are gradually developing in the direction of light weight and miniaturization. Polymer lithium-ion button cells have the advantages of small size, light weight, and large capacity, and are therefore widely used in various miniature electronic products.

A button cell is shaped as a cylinder, the bottom surface of one end of cylinder is integral with a shell of the button cell, and the other end is provided with a steel ring-shaped metal cover plate. An outer diameter end of the metal cover plate is connected to the shell of the button cell, and the surface of an inner diameter end thereof is bonded to an outer diameter end of an aluminum metal ring with an electrically insulating seal. An inner diameter end of the aluminum metal ring is an electrolyte filling port of the button cell. An operator or an operating system fills the button cell with an electrolyte through the electrolyte filling port, and then seals the electrolyte filling port with a port sealing sheet.

However, the above-described battery has low stability, poor sealing performance, and poor safety.

SUMMARY

In order to solve at least one problem mentioned in the background, the present disclosure provides a battery, which improves application stability of the battery and improves sealing performance and safety of the battery.

In order to achieve the above objectives, the present disclosure provides a battery, including a housing. The housing is a metal piece. The housing includes a bottom shell and a cap, and the cap covers an opening of the bottom shell.

The cap includes a mounting hole. A conductive sealing pin is disposed in the mounting hole. A side periphery of the sealing pin is provided with a clamping groove. The cap close to the mounting hole extends into the clamping groove and is in clamped connection to the clamping groove.

A seal is provided at a connection between the clamping groove and the cap, and the seal is an electrical insulator.

In the above-described battery, optionally, the sealing pin is provided with an electrolyte filling port, and the electrolyte filling port is at a center of the cap.

The housing has an accommodating cavity, and the electrolyte filling port is in communication with the accommodating cavity.

In the above-described battery, optionally, a mounting recess is provided on a side of the sealing pin away from the bottom shell, and the electrolyte filling port is at a bottom of the mounting recess.

A port sealing member is disposed in the mounting recess, a surface of the port sealing member is lower than a mouth of the mounting recess, and the port sealing member seals the electrolyte filling port.

In the above-described battery, optionally, a center of the port sealing member and a center of the electrolyte filling port are located on a central axis of the cap.

In the above battery, optionally, a diameter of the electrolyte filling port ranges from 0.5 mm to 3 mm, and/or a distance between an outer edge of the port sealing member and a wall of the mounting recess ranges from 0 mm to 2 mm, and/or a distance between a side of the sealing pin close to the bottom shell and the bottom of the mounting recess ranges from 0.1 mm to 2 mm, and/or a depth of the mounting recess ranges from 0 mm to 1 mm.

In the above battery, optionally, the battery includes a battery module, the battery module is located in the accommodating cavity, and a central axis of the battery module coincides with that of the housing.

A distance between a side of the sealing pin close to the battery module and the battery module ranges from 0.1 mm to 3 mm, and/or a thickness of a wall of the clamping groove outside the housing ranges from 0 mm to 1 mm.

In the above-described battery, optionally, the accommodating cavity includes an electrolyte storage region and a cell storage region, the battery module is located in the cell storage region, the electrolyte filling port is disposed opposite the electrolyte storage region, and the electrolyte filling port is in communication with the electrolyte storage region.

In the above-described battery, optionally, the battery module includes a first electrode plate and a second electrode plate, the first electrode plate and the second electrode plate are staggered and stacked on each other, and an electrically insulating separator is disposed between the first electrode plate and the second electrode plate that are adjacent to each other. The first electrode plate is provided with a first tab, and the first tab is electrically connected to the sealing pin, forming a first electrode of the battery. The second electrode plate is provided with a second tab, and the second tab is electrically connected to the housing, forming a second electrode of the battery.

In the above-described battery, optionally, a hollow reel is provided at a center of the accommodating cavity, and the battery module is wound on the reel. The electrolyte storage region is formed inside the reel, and an outer wall surface of the battery module is coated with an insulating glue.

In the above-described battery, optionally, the first tab and the second tab are on a same side of the reel; and/or a plane in which the first tab is located has an included angle with a plane in which the second tab is located, and the included angle ranges from 0° to 180°; and/or the first tab and the second tab are fixed in the battery module by means of bending, and a bending angle of the first tab and/or the second tab ranges from 45° to 90°.

According to the battery provided in the present disclosure, the side periphery of the cap is provided with the clamping groove, and the cap close to the mounting hole is defined to extend into the clamping groove, and to be in clamped connection to the clamping groove, thereby improving reliability of connection between the sealing pin and the cap. The provision of the seal at the connection between the clamping groove and the cap avoids a connection short circuit between the sealing pin and the cap, and also improves the sealing performance of the housing of the battery. Due to the provision of the clamping groove, the seal is tightly clamped between the sealing pin and the cap all the time, ensuring that the battery adapts to various harsh application environments, and improving the application stability and safety of the battery.

The content of the battery provided in the present disclosure and the objectives and beneficial effects of the present disclosure will be more apparent and comprehensible by the description of the preferred embodiments in conjunction with the accompanying drawings.

BRIEF DESCRIPTION OF THE DRAWINGS

In order to more clearly describe the technical solutions in the embodiments of the present disclosure or in the prior art, the accompanying drawings required for describing the embodiments or the prior art will be briefly described below Apparently, the accompanying drawings in the following description show some of the embodiments of the present disclosure, and those of ordinary skill in the art may still derive other drawings from these drawings without involving any inventive effort.

DETAILED DESCRIPTION OF THE EMBODIMENTS

A button cell is shaped as a cylinder, the bottom surface of one end of the cylinder is integral with a shell of the button cell, the other end is provided with a steel ring-shaped metal cover plate. An outer diameter end of the metal cover plate is connected to the shell of the button cell, and the surface of an inner diameter end thereof is bonded to an aluminum metal ring with an insulating seal. In the related art, polypropylene glue (PP glue) is mostly used for the insulating insulator. An inner diameter end of the aluminum metal ring is an electrolyte filling port of the button cell. An operator or an operating system fills the button cell with an electrolyte through the electrolyte filling port, and then seals the electrolyte filling port with a port sealing sheet. However, when the battery is in a harsh application environment, such as high temperature and high humidity, the PP glue is prone to softening, which increases a probability of its falling off the metal cover plate and the aluminum metal ring, affects sealing performance of the battery, and increases a probability of battery electrolyte leakage, thereby reducing safety of the battery.

In view of the above-described technical problems, according to the battery provided in the present disclosure, a side periphery of a cap is provided with a clamping groove, and the cap close to a mounting hole is defined to extend into the clamping groove, and to be in clamped connection to the clamping groove, thereby improving reliability of connection between a sealing pin and the cap. The provision of a seal at a connection between the clamping groove and the cap avoids a connection short circuit between the sealing pin and the cap, and also improves the sealing performance of a housing of the battery. Due to the provision of the clamping groove, the seal is tightly clamped between the sealing pin and the cap all the time, ensuring that the battery adapts to various harsh application environments, and improving application stability and safety of the battery.

In order to make the objectives, technical solutions, and advantages of the present disclosure clearer, the technical solutions in the embodiments of the present disclosure will be described in more detail below in conjunction with the accompanying drawings in the preferred embodiments of the present disclosure. Throughout the accompanying drawings, the same or similar reference numerals refer to the same or similar components or components having the same or similar functions. The embodiments described are some rather than all of the embodiments of the present disclosure. The embodiments described below with reference to the accompanying drawings are exemplary and are intended to be illustrative of the present disclosure, but should not be construed as limiting the present disclosure. All other embodiments derived by those of ordinary skill in the art based on the embodiments of the present disclosure without any inventive effort shall fall within the scope of protection of the present disclosure. The embodiments of the present disclosure are described in detail below with reference to the accompanying drawings.

Figure 1:
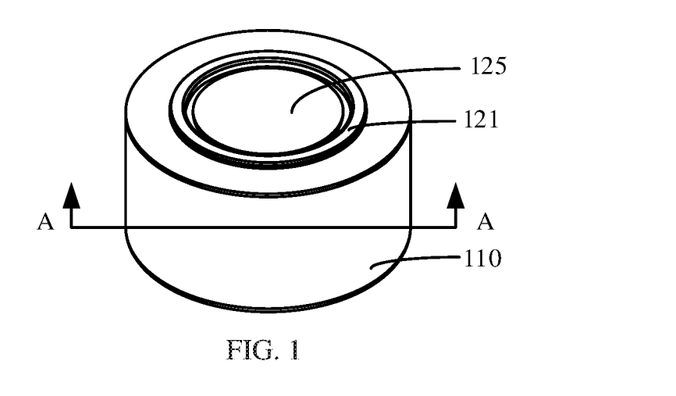
FIG. 1 is a schematic diagram of an overall structure of a battery according to an embodiment of the present disclosure.
Figure 2:
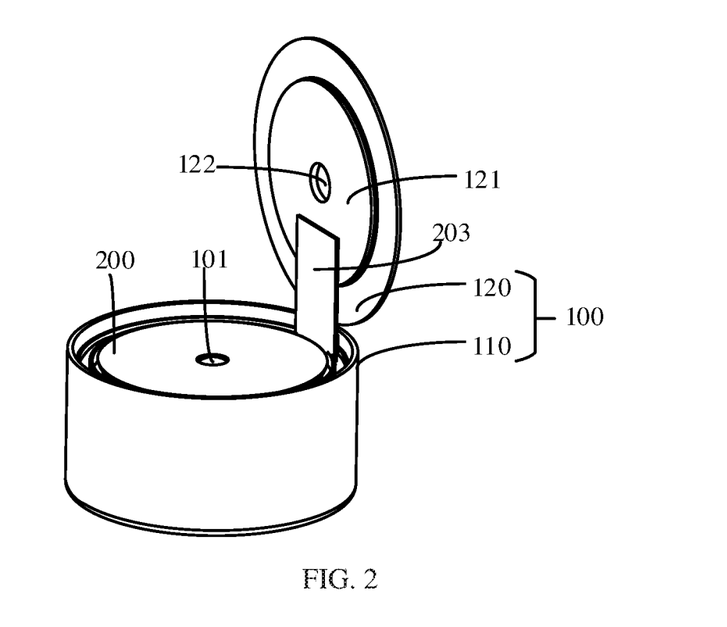
FIG. 2 is a schematic structural diagram of a battery during assembly according to an embodiment of the present disclosure.
Figure 3:
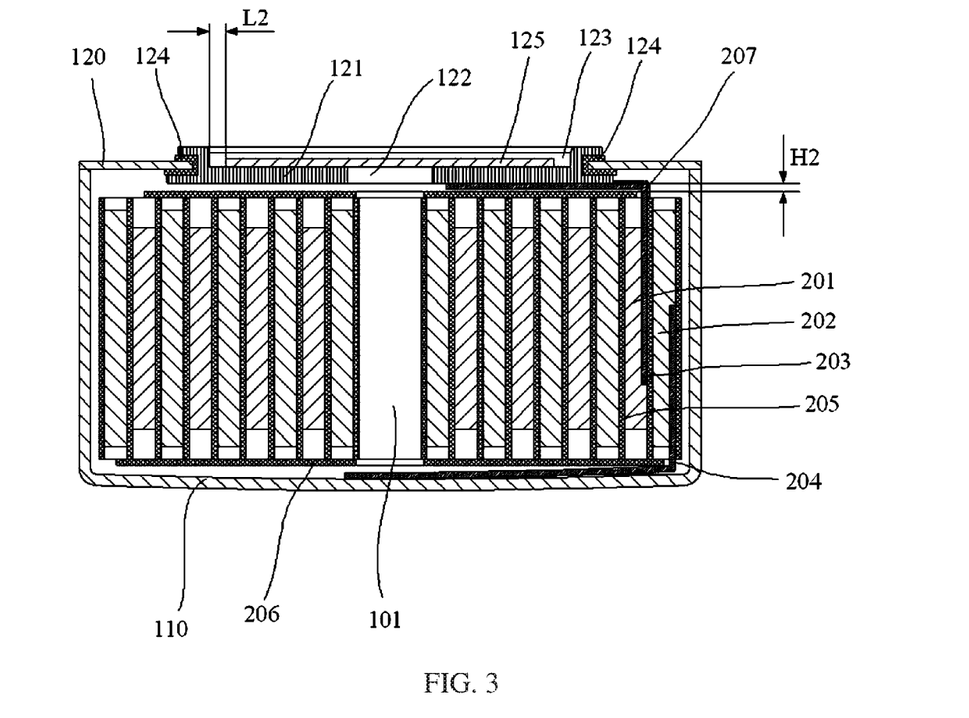
FIG. 3 is a sectional view of a structure of a battery according an embodiment of the present disclosure.
Figure 4:
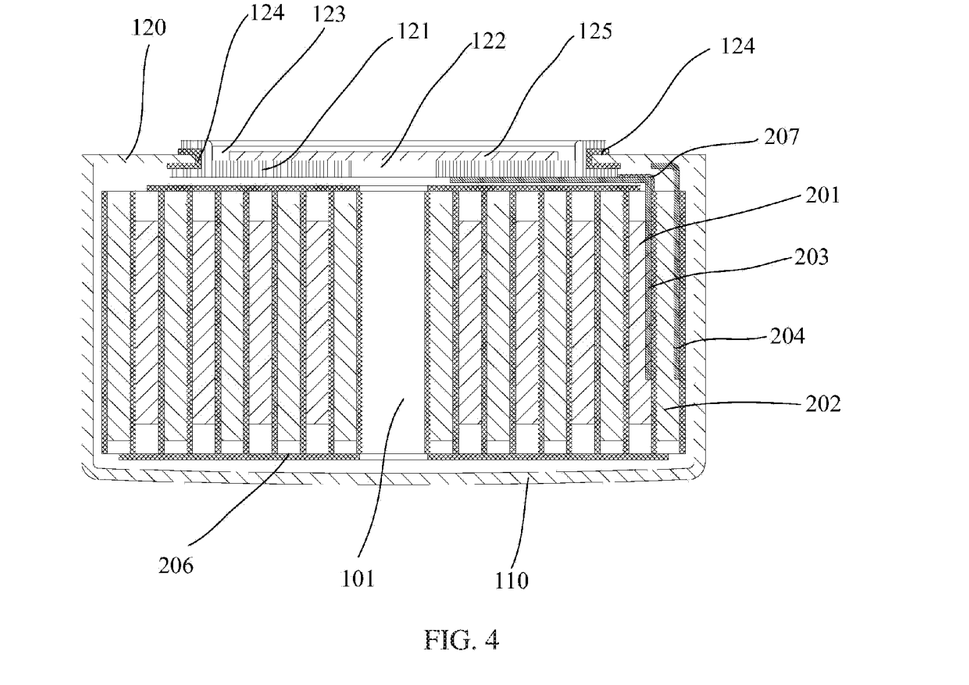
FIG. 4 is a sectional view of another structure of a battery according to an embodiment of the present disclosure.
Figure 5:
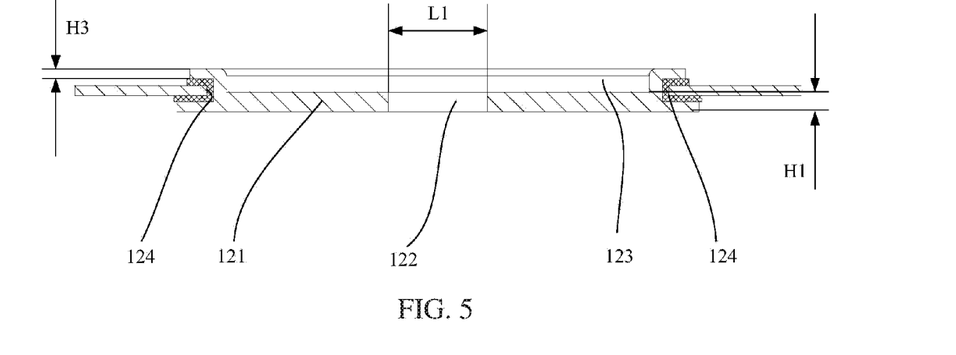
FIG. 5 is a schematic structural diagram of a cap of a battery according to an embodiment of the present disclosure.
Figure 6:
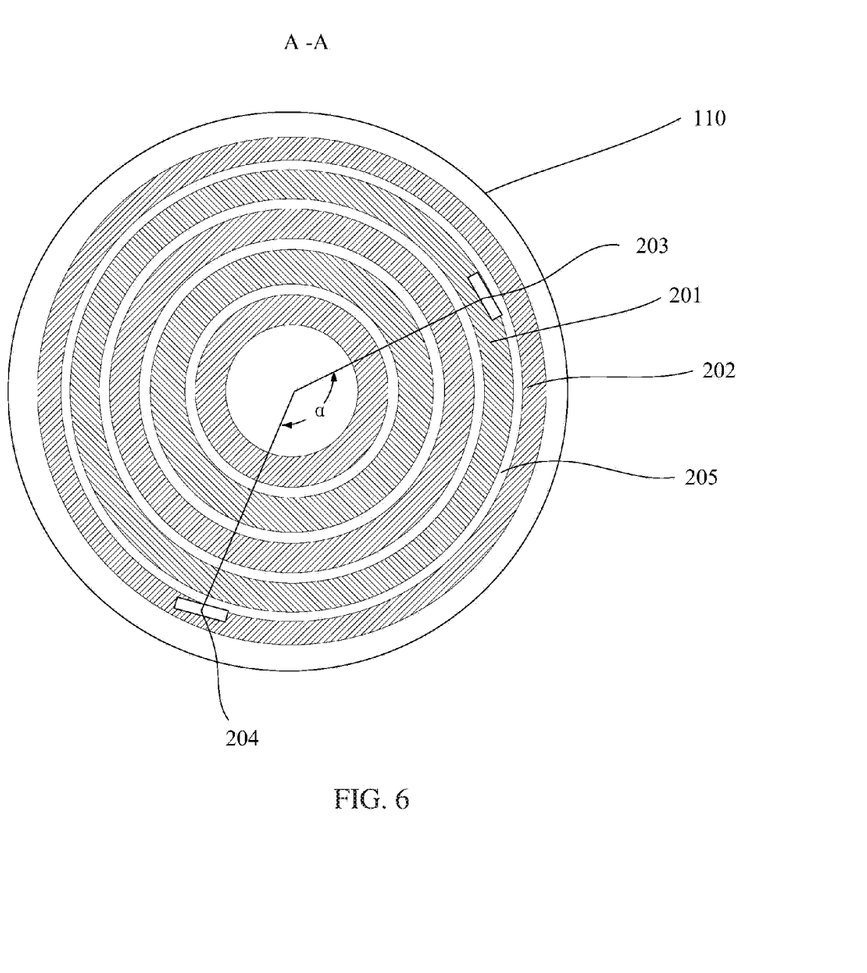
FIG. 6 is a schematic structural diagram of the battery in an A-A section of FIG. 1 according to an embodiment of the present disclosure.

FIG. 1 is a schematic diagram of an overall structure of a battery according to an embodiment of the present disclosure; FIG. 2 is a schematic structural diagram of a battery during assembly according to an embodiment of the present disclosure; FIG. 3 is a sectional view of a structure of a battery according to an embodiment of the present disclosure; FIG. 4 is a sectional view of another structure of a battery according to an embodiment of the present disclosure; FIG. 5 is a schematic structural diagram of a cap of a battery according to an embodiment of the present disclosure; and FIG. 6 is a schematic structural diagram of the battery in an A-A section of FIG. 1 according to an embodiment of the present disclosure.

Referring to FIG. 1 to FIG. 6, an embodiment of the present disclosure provides a battery, including a housing 100. The housing 100 is a metal piece. The housing 100 includes a bottom shell 110 and a cap 120, and the cap 120 covers an opening of the bottom shell 110. The cap 120 includes a mounting hole. A conductive sealing pin 121 is disposed in the mounting hole. A side periphery of the sealing pin 121 is provided with a clamping groove. The cap 120 close to the mounting hole extends into the clamping groove and is in clamped connection to the clamping groove. A seal 124 is provided at a connection between the clamping groove and the cap 120, and the seal 124 is an electrical insulator. The clamped connection between the cap 120 and the sealing pin 121 improves the connection reliability between the two. The seal 124 is provided therein, and the seal 124 is provided as the electrical insulator with specific elasticity and corrosion resistance, to seal the battery and prevent the battery from short-circuiting. During installation, an external force acts on a side of the sealing pin 121 away from the bottom shell 110, the sealing pin 121 undergoes a specific plastic deformation, and a contact area between a side of the sealing pin 121 close to the bottom shell 110 and the seal 124 is increased, thereby increasing an acting force between the seal 124 and the sealing pin 121. Such an arrangement can ensure that the seal 124 is tightly clamped between the sealing pin 121 and the cap 120 all the time. When an external environment is relatively harsh, the seal 124 can always play the role of sealing the battery and isolating the cap 120 from the sealing pin 121, which ensures that the battery adapts to various harsh application environments, and improves the application stability and safety of the battery.

It should be noted that the seal 124 is a rubber ring structure, which is provided on the mounting hole of the cap 120. A material of the seal 124 is one or more of EPDM rubber; fluorine rubber, silicone rubber, and PR in addition, preferably, in order to improve sealing effect of the sealing pin 121 and the mounting hole, a contact area between a side of the cap 120 away from the bottom shell 110 and the seal 124 should be less than that between a side of the cap 120 close to the bottom shell 110 and the seal 124, thereby ensuring that the acting force between the seal 124 and a side of the sealing pin 121 close to the bottom shell 110 is relatively large.

As a feasible implementation, the sealing pin 121 is provided with an electrolyte filling port 122, and the electrolyte filling port 122 is at a center of the cap 120. The housing 100 has an accommodating cavity, and the electrolyte filling port is in communication with the accommodating cavity. A battery module 200 is provided in the accommodating cavity. The battery module 200 enters a cell storage region in the accommodating cavity of the battery through the mounting hole. The sealing pin 121 plays the role of sealing the housing 100 of the battery. The electrolyte filling port 122 is provided in the sealing pin 121, thereby simplifying the structure of the cap 120 of the battery. An electrolyte enters the accommodating cavity through the electrolyte filling port 122, and then directly enters an electrolyte storage region 101. Under the action of gravity, the electrolyte directly reaches a bottom of the housing 100 of the battery, and then infiltrates the battery module 200 on both sides.

It should be noted that a shape of an outer edge of the electrolyte filling port 122 may be a circle. In this case, a center of the circle coincides with a center of the cap 120. Alternatively, the shape of the outer edge of the electrolyte filling port 122 may be a polygon. In this case, the polygon is symmetrically distributed with respect to the center of the cap 120. Certainly, the shape of the outer edge of the electrolyte filling port 122 may alternatively be an asymmetrical polygon, and the shape of the outer edge of the electrolyte filling port is not limited in the embodiments of the present disclosure.

As a feasible implementation, a mounting recess 123 is provided on a side of the sealing pin 121 away from the bottom shell 110, and the electrolyte filling port 122 is at a bottom of the mounting recess 123. A port sealing member 125 is disposed in the mounting recess 123, a surface of the port sealing member 125 is lower than a mouth of the mounting recess 123, and the port sealing member 125 seals the electrolyte filling port 122. Such an arrangement may ensure that the battery has good sealing performance and prevents the injected electrolyte from leaking out through the electrolyte filling port 122.

Both the sealing pin 121 and the port sealing member 125 are made of metal, and preferably aluminum or aluminum alloy. Aluminum or aluminum alloy has good electrical conductivity, and is soft and relatively stable in air. When the battery provided in the present disclosure is a lithium-ion battery, the selection of aluminum as a preferred material for the sealing pin 121 and the port sealing member 125 can ensure operating performance of the battery. In addition, the bottom shell 110 and the cap 120 of the housing 100 are preferably made of steel, which may avoid a hydrolysis reaction of the housing 100 of the lithium-ion battery under a high potential and improve the stability of the battery.

The port sealing member 125 and the sealing pin 121 are connected together by welding. The welding is one or more of resistance welding, ultrasonic welding, and laser welding. The above-mentioned methods of welding do not require welding materials; thereby avoiding an increase in the weight of the battery due to the welding of the port sealing member 125 to the sealing pin 121, so as not to reduce a range of usage scenarios of the battery or affect the operating performance of the battery.

It should be noted that a shape of an outer edge of the port sealing member 125 may be a circle, in which case a center of the circle coincides with a center of the electrolyte filling port 122; alternatively, the shape of the outer edge of the port sealing member 125 may be a polygon, in which case a center of the polygon coincides with the center of the electrolyte filling port 122, and a side of the port sealing member 125 close to the electrolyte filling port 122 should completely cover the electrolyte filling port 122 to ensure a sealing effect of the port sealing member 125 on the electrolyte filling port 122. Certainly, the shape of the outer edge of the port sealing member 125 may be the same as or different from that of the outer edge of the electrolyte filling port 122; which is not limited in the embodiments, as long as the port sealing member can cover the electrolyte filling port. For the schematic diagram of the overall structure of the battery and a schematic structural diagram of the port sealing member provided in the embodiments of the present disclosure, reference may be made to FIG. 1.

As a feasible implementation, the center of the port sealing member and the center of the electrolyte filling port are located on a central axis of the cap. In the embodiments, the electrolyte filling port is provided at a center of the cap 120, and the electrolyte that enters the accommodating cavity of the battery through the electrolyte filling port 122 may directly enter a center of the accommodating cavity; thereby reducing a working time of an electrolyte injector during an electrolyte filling process of the battery, and improving efficiency of battery processing and preparation.

As a feasible implementation, referring to FIG. 3 and FIG. 5, a diameter L1 of the electrolyte filling port 122 ranges from 0.5 mm to 3 mm. The setting of the diameter L1 of the electrolyte filling port 122 may ensure a fast electrolyte filling speed of the electrolyte filling port while ensuring strength of the sealing pin 121. When the diameter L1 of the electrolyte filling port 122 is less than 0.5 mm, the diameter L1 of the electrolyte filling port 122 is too small, and the electrolyte filling speed of the battery is relatively slow, which affects the efficiency of battery processing and preparation. When the diameter L1 of the electrolyte filling port 122 is greater than 3 mm, the diameter of the electrolyte filling port 122 is too large, which causes mechanical strength of the sealing pin 121 to be too small, and reduces the stability and safety of the battery. The value of the diameter L1 of the electrolyte filling port 122 may be set according to actual processing requirements or usage requirements, which is not limited in the embodiments of the present disclosure.

Further, a distance L2 between an outer edge of the port sealing member 125 and a wall of the mounting recess 123 ranges from 0 mm to 2 mm. When the value of L2 is 0, the port sealing member 125 and the wall of the mounting recess 123 are tightly connected. A specific distance between the outer edge of the port sealing member 125 and the wall of the mounting recess 123 is provided to facilitate the assembly and welding of the port sealing member. However, when the value of L2 is greater than 2 mm, the distance between the port sealing member 125 and the wall of the mounting recess 123 is too large, which reduces the overall aesthetics of the battery, and dust easily accumulates in the gap, causing a specific risk to the battery application. In specific processing or application, the distance L2 between the outer edge of the port sealing member 125 and the wall of the mounting recess 123 may be set according to the needs of a user, which is not limited in the embodiments of the present disclosure.

Further, a distance H1 between a side of the sealing pin 121 close to the bottom shell 110 and the bottom of the mounting recess 123 ranges from 0.1 mm to 2 mm. Setting the value of H1 to be greater than 0.1 mm can ensure that the sealing pin 121 has high strength, so as to achieve the function of sealing the battery module 200 and the electrolyte. However, the value of H1 cannot be too large. When the value of H1 is greater than 2 mm, a thickness of the sealing pin 121 is too large, which increases the difficulty of welding between the port sealing member 125 and the sealing pin 121, and affects the connection between the port sealing member 125 and the sealing pin 121, thereby reducing the efficiency of battery processing and preparation.

Further, a depth of the mounting recess 123 ranges from 0 mm to 1 mm. When the depth of the mounting recess is 0, in which case no mounting recess is provided on the sealing pin 121, the port sealing member 125 may be directly welded to a side of the sealing pin away from the battery module 200. Alternatively, the port sealing member 125 may be provided in the mounting recess 123 to improve the aesthetics of the battery. However, the larger the depth of the mounting recess 123, the smaller a thickness between a side of the sealing pin 121 close to the battery module 200 and the bottom of the mounting recess 123, thereby affecting the application performance of the sealing pin 121. In order to ensure that the sealing pin 121 has better performance and can bear a larger acting force, the depth of the mounting recess 123 should be less than or equal to 1 mm.

As a feasible implementation, the accommodating cavity includes the electrolyte storage region 101 and the cell storage region. Referring to FIG. 2, the battery module 200 is located in the cell storage region, and the housing 100 is provided with the electrolyte filling port 122. Referring to FIG. 3, the electrolyte filling port 122 is disposed opposite the electrolyte storage region 101, and the electrolyte filling port 122 is in communication with the electrolyte storage region 101. The electrolyte enters the accommodating cavity through the electrolyte filling port 122, and then directly enters the electrolyte storage region 101. Under the action of gravity, the electrolyte directly reaches the bottom of the housing 100 of the battery, and then infiltrates the battery module 200 on both sides.

In order to ensure that the electrolyte can infiltrate the battery module 200 as soon as possible and improve the stability of the battery, as shown in FIG. 3 and FIG. 4, as a feasible implementation, the electrolyte storage region 101 is at a center of the accommodating cavity, and the cell storage region is formed between an outer edge of the electrolyte storage region 101 and a surface of an inner wall of the housing 100. A central axis of the battery module 200 coincides with a central axis of the housing 100. After the electrolyte enters the accommodating cavity through the electrolyte filling port 122, the electrolyte in the electrolyte storage region 101 is symmetrically distributed with respect to the center of the accommodating cavity, and then the electrolyte flows to both sides at the same time. The time required for the electrolyte to infiltrate both sides of the battery module 200 is roughly the same. A distance H2 between a side of the sealing pin 121 close to the battery module 200 and the battery module 200 ranges from 0.1 mm to 3 mm. The value of H2 is set to be greater than 0.1 mm, so that sufficient space can be provided for the mounting of the first tab 203. However, the value of H2 cannot be too large. When the value of H2 is greater than 3 mm, a large energy loss of the battery is caused by the excessively large gap between the battery module 200 and the sealing pin 121, which affects electricity storage and service life of the battery. Further, Referring to FIG. 5, a thickness H3 of a wall of the clamping groove outside the housing 100 ranges from 0 mm to 1 mm. When the value of H3 is 0, no clamping groove is provided between the sealing pin 121 and the cap 120. The clamping groove is provided to achieve the clamped connection between the cap 120 and the sealing pin 121, thereby improving the sealing effect of the seal 124 on the battery. When the value of H3 is greater than 1 mm, an overall thickness of the cap 120 of the battery is increased, and the weight of the battery is increased, which cannot satisfy the applicability of the battery in miniature electronic devices and precision electronic devices.

Referring to FIG. 3 and FIG. 4, as a feasible implementation, the battery module 200 includes a first electrode plate 201 and a second electrode plate 202, the first electrode plate 201 and the second electrode plate 202 are staggered and stacked on each other, and an electrically insulating separator 205 is disposed between the first electrode plate 201 and the second electrode plate 202 that are adjacent to each other. The first electrode plate 201 is provided with a first tab 203, and the first tab 203 is electrically connected to the sealing pin 121, forming a first electrode of the battery. The second electrode plate 202 is provided with a second tab 204, and the second tab 204 is electrically connected to the housing 100, forming a second electrode of the battery. The separator 205 plays the role of isolating the first electrode plate 201 from the second electrode plate 202, preventing an internal short circuit due to the two electrode plates being in contact with each other. When the battery provided in the embodiments of the present disclosure is a lithium-ion battery, the separator 205 may be a semi-permeable layer that prevents the passage of relatively large molecules and allows only the passage of relatively small charged ions, which may increase a concentration difference near the positive and negative electrodes, and facilitate the diffusion of ions, thereby improving storage efficiency of the battery.

The first electrode plate 201 and the second electrode plate 202 each are coated with a battery active material. Preferably, a surface of the first electrode plate 201 is coated with one or more of lithium cobalt oxide, lithium nickel cobalt manganese oxide, lithium nickel cobalt manganese aluminum oxide, lithium nickel cobalt aluminum oxide, lithium manganate, lithium iron phosphate, and lithium ferrous phosphate, and a surface of the second electrode plate 202 is coated with one or more of graphite, silicon carbon, silicon oxygen, lithium titanate, and hard carbon. In this case, the first electrode plate 201 is a positive electrode plate of the battery, and the second electrode plate 202 is a negative electrode plate of the battery. In order to ensure the safety performance of the battery, a total area of the second electrode plate 202 should be greater than that of the first electrode plate 201.

Referring to FIG. 3 or 4, one end of the first tab 203 is welded to the first electrode plate 201, and the other end thereof is welded to the sealing pin 121, so as to achieve the connection between the first electrode plate 201 and the sealing pin 121. A side on which the sealing pin 121 of the battery is located is a first electrode of the battery. In a preferred embodiment, the first electrode is the positive electrode. Referring to FIG. 4, one end of the second tab 204 is welded to the second electrode plate 202, and the other end thereof is welded to the cap 120 of the battery, so as to achieve the connection between the second electrode plate 202 and the cap of the battery. In this case, a position in which the cap 120 of the battery is located is a second electrode of the battery. Alternatively, as shown in FIG. 3, one end of the second tab 204 is welded to the second electrode plate 202, and the other end thereof is welded to the bottom shell 110 of the battery, so as to achieve the connection between the second electrode plate 202 and the bottom shell 110 of the battery. In this case, a position in which the bottom shell is located is the second electrode of the battery. In a preferred embodiment, the second electrode is the negative electrode. The welding of the first tab 203 and the first electrode plate 201, the first tab 203 and the sealing pin 121, the second tab 204 and the second electrode plate 202, the second tab 204 and the cap 120, and the second tab 204 and the bottom shell 110 is one or more of resistance welding, ultrasonic welding, and laser welding.

In addition, referring to FIG. 3 or 4, in order to avoid a lap short circuit between the first tab 203 and the cap 120 or the bottom shell 110, a tab glue 207 is provided on an outer side of the first tab 203, and the tab glue 207 is an electrical insulator.

As a feasible implementation, referring to FIG. 3 or 4, a hollow reel is provided at the center of the accommodating cavity, and the battery module 200 is wound on the reel. The electrolyte storage region 101 is formed inside the reel, and an outer wall surface of the battery module 200 is coated with an insulating glue 206.

The first electrode plate 201, the second electrode plate 203, and the separator 205 are wound into the battery module 200 in the embodiments of the present disclosure, and such an arrangement can increase areas of the first electrode plate 201 and the second electrode plate 202, thereby increasing capacity of the battery. The winding arrangement of the battery module 200 can increase an infiltration area between the electrolyte and the battery module, so as to improve the operating performance of the battery. In addition, the insulating glue 206 provided outside the battery module 200 can prevent a lap short circuit between the first electrode plate 201 and the battery housing 200, or between the second electrode plate 202 and the battery housing 200.

As a feasible implementation, referring to FIG. 3, FIG. 4, and FIG. 6, the first tab 203 and the second tab 204 are on a same side of the reel; or a plane in which the first tab 203 is located has an included angle α with a plane in which the second tab 204 is located, and the included angle α ranges from 0° to 180°; or the first tab 203 and the second tab 204 are fixed in the battery module 200 by means of bending, a bending angle of the first tab 203 and the second tab 204 ranging from 45° to 90°.

Preferably, the included angle α ranges from 90° to 180°. Such an arrangement may keep a distance between the first tab 203 and the second tab 204 large enough to avoid a lap short circuit in the arrangement of the accommodating cavity of the battery in the future.

In conclusion, the battery provided in the present disclosure solves the problems of low stability, poor sealing performance, and poor safety of the battery in the related art. The electrolyte filling port is provided in the sealing pin, and the sealing pin is provided with the mounting recess, which simplifies the structure of the battery, and reduces the volume of the battery and the weight of the battery. The cap 120 is clamped to the sealing pin 121, and the seal 124 is provided at the clamping position, which improves the sealing performance; so that the battery adapts to a plurality of application environments, thereby improving the stability and safety of the battery provided in the embodiments of the present disclosure.

In the description of the present disclosure, it should be noted that, unless otherwise defined and limited explicitly, the terms "mounting", "connection", and "coupling" should be construed in a broad sense, which may be, for example, a fixed connection, or may be an indirect connection by means of an intermediate medium, or a connection between two elements or an interaction between two elements. For those of ordinary skill in the art, specific meanings of the foregoing terms in the present disclosure may be understood based on specific situations. An orientation or a position relationship indicated by the terms such as "upper", "lower", "front", "back", "vertical", "horizontal", "top", "bottom", "inner", or "outer" is based on an orientation or a position relationship shown in the accompanying drawings and is merely for ease of description of the present disclosure and simplification of the description, rather than indicating or implying that an indicated apparatus or element needs to have a particular orientation or be constructed and operated in a particular orientation, and therefore cannot be construed as limiting the present disclosure. In the description of the embodiments of the present disclosure, "a plurality of" means two or more, unless otherwise expressly and specifically defined.

The terms "first", "second", "third", "fourth", etc. (if any) in the specification and the claims of this application and the foregoing accompanying drawings are used to distinguish between similar objects and are not necessarily used to describe a specific order or sequence. It should be understood that data termed in such a way are interchangeable as appropriate, so that the embodiments of the present disclosure described herein can, for example, be implemented in an order other than those illustrated or described herein. In addition, the terms "including" and "having", and any variations thereof, are intended to cover a non-exclusive inclusion, for example, a process, method, system, product, or device including a series of steps or units is not necessarily limited to those steps or units explicitly listed, and may include other steps or units not explicitly listed or inherent to the process, method, product, or device.

Finally, it should be noted that the foregoing embodiments are only used to illustrate the technical solutions of the present disclosure, and are not intended to limit same. Although the present disclosure is described in detail with reference to the foregoing embodiments, those of ordinary skill in the art should understand that they can still modify the technical solutions described in the foregoing embodiments, or make equivalent substitutions to some or all technical features therein. These modifications or substitutions do not make the essence of the corresponding technical solutions depart from the scope of the technical solutions of the embodiments of the present disclosure.

What is claimed is:

1. A battery, comprising a housing; wherein the housing is a metal piece, and the housing comprises a bottom shell and a cap, the cap covers an opening of the bottom shell;
the cap comprises a mounting hole, a conductive sealing pin disposed in the mounting hole, a side periphery of the sealing pin is provided with a clamping groove, and the cap close to the mounting hole extends into the clamping groove and is in clamped connection to the clamping groove; and
a seal is provided at a connection between the clamping groove and the cap, the seal is an electrical insulator.

2. The battery according to claim 1, wherein the sealing pin is provided with an electrolyte filling port, the electrolyte filling port is at a center of the cap; and
the housing has an accommodating cavity, the electrolyte filling port is in communication with the accommodating cavity.

3. The battery according to claim 2, wherein a mounting recess is provided on a side of the sealing pin away from the bottom shell, the electrolyte filling port is at a bottom of the mounting recess; and
a port sealing member is disposed in the mounting recess, a surface of the port sealing member is lower than a mouth of the mounting recess, and the port sealing member seals the electrolyte filling port.

4. The battery according to claim 3, wherein the port sealing member and the sealing pin are connected together by welding, and the welding is one or more of resistance welding, ultrasonic welding, and laser welding.

5. The battery according to claim 3, wherein a center of the port sealing member coincides with a center of the electrolyte filling port, and a side of the port sealing member close to the electrolyte filling port completely covers the electrolyte filling port.

6. The battery according to claim 3, wherein a center of the port sealing member and a center of the electrolyte filling port are located on a central axis of the cap.

7. The battery according to claim 3, wherein a distance between an outer edge of the port sealing member and a wall of the mounting recess ranges from 0 mm to 2 mm.

8. The battery according to claim 3, wherein a distance between a side of the sealing pin close to the bottom shell and the bottom of the mounting recess ranges from 0.1 mm to 2 mm.

9. The battery according to claim 3, wherein a depth of the mounting recess ranges from 0 mm to 1 mm.

10. The battery according to claim 2, wherein a diameter of the electrolyte filling port ranges from 0.5 mm to 3 mm.

11. The battery according to claim 2, comprising a battery module, wherein the battery module is located in the accommodating cavity, a central axis of the battery module coincides with that of the housing; and
a distance between a side of the sealing pin close to the battery module and the battery module ranges from 0.1 mm to 3 mm.

12. The battery according to claim 11, wherein the accommodating cavity comprises an electrolyte storage region and a cell storage region, the battery module is located in the cell storage region, the electrolyte filling port is disposed opposite the electrolyte storage region, and the electrolyte filling port is in communication with the electrolyte storage region.

13. The battery according to claim 11, wherein the battery module comprises a first electrode plate and a second electrode plate, the first electrode plate and the second electrode plate are staggered and stacked on each other, and an electrically insulating separator is disposed between the first electrode plate and the second electrode plate that are adjacent to each other;
the first electrode plate is provided with a first tab, the first tab electrically connected to the sealing pin, forming a first electrode of the battery; and
the second electrode plate is provided with a second tab, the second tab electrically connected to the housing, forming a second electrode of the battery.

14. The battery according to claim 13, wherein a tab glue is provided on an outer side of the first tab, and the tab glue is an electrical insulator.

15. The battery according to claim 11, wherein a hollow reel is provided at a center of the accommodating cavity, and the battery module is wound on the reel; and
the electrolyte storage region is formed inside the reel, and an outer wall surface of the battery module is coated with an insulating glue.

16. The battery according to claim 15, wherein the first tab and the second tab are on a same side of the reel.

17. The battery according to claim 11, wherein a plane in which the first tab is located has an included angle with a plane in which the second tab is located, the included angle ranging from 0° to 180°.

18. The battery according to claim 11, wherein the first tab and the second tab are fixed in the battery module by means of bending, a bending angle of the first tab and/or the second tab ranging from 45° to 90°.

19. The battery according to claim 1, wherein a thickness of a wall of the clamping groove outside the housing ranges from 0 mm to 1 mm.

20. The battery according to claim 1, wherein a contact area between a side of the cap away from the bottom shell and the seal is less than that between a side of the cap close to the bottom shell and the seal.

* * * * *